Patented June 6, 1933

1,913,237

UNITED STATES PATENT OFFICE

HERMANN HILLEBRAND, OF BERLIN, GERMANY

CONTINUOUS WATER GAS GENERATION

Application filed August 21, 1929, Serial No. 387,497, and in Austria July 1, 1929.

This invention relates to a method of producing water gas from fuels in finely divided condition in continuous operation without making use of a solid fuel bed, in which the fuel is carried in state of suspension by a flow of steam with which it is to react in order to form water gas.

It is known in the case of water gas generators operating in continuous process to charge a current of water gas, or a mixture of water gas and steam, with the heat necessary for forming the gas, the said current or mixture respectively—heated in a special heating apparatus—conducting the heat to the gas-generating shaft.

According to the present invention it is proposed to introduce the highly heated steam, or the heated mixture of steam and water gas, continuously into the reaction chamber not only at the entry of the fuel but also at a plurality of points along the initial course of the current which is a mixture of the steam introduced at the entry of the fuel and of water gas generated by reaction of part of the fuel with the steam, which current carries the finely divided fuel in state of suspension along with it.

Numerous advantages are obtained by an arrangement of this kind. If, for example, the pulverulent coal, hydrocarbons, or other gas-generating materials employed are not introduced at the same temperature as the highly heated gas, the heating of this material to the requisite degree deprives the reaction of a corresponding amount of heat.

Owing to consumption of heat during the reaction accompanied by corresponding drop in temperature the velocity of reaction becomes slower and the reaction of the fuel with the steam finally becomes incomplete. This disadvantage is overcome with the arrangement according to this invention, in which additional heat which is carried into the process by the heated steam or the heated mixture of steam and water gas, is admitted to the fuel which is suspended by the current of steam and water gas.

It will be seen, therefore, that the method according to the invention enables a more rapid reaction, a greater output and a better composition of the gas to be obtained.

The regulation of the heat may be effected as desired, both as regards time as well as point of introduction.

In the accompanying drawing there is shown diagrammatically an apparatus adapted for carrying out the process forming the subject of this invention.

Figure 1:
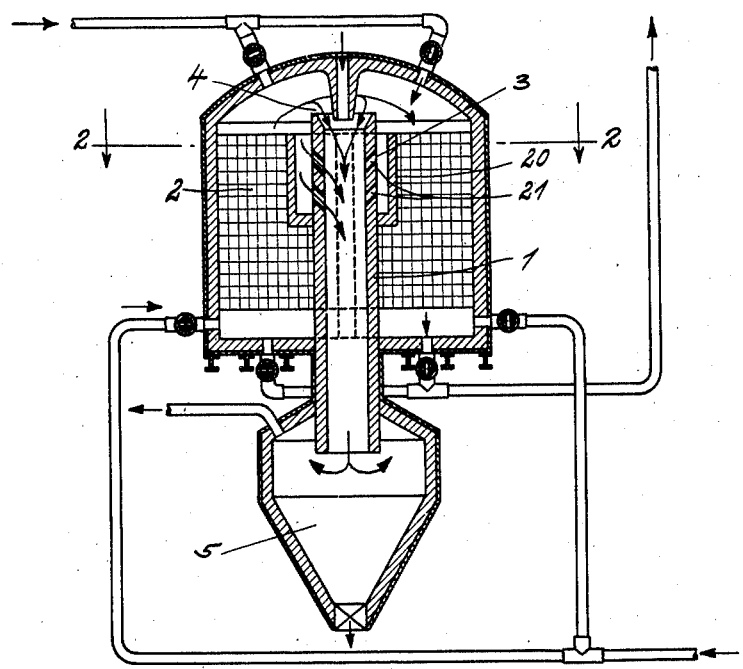

Figure 1 of the drawing is a vertical central section through the apparatus.

Figure 2:
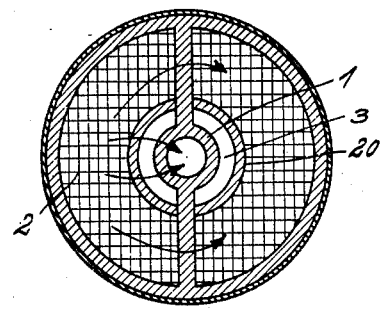

Figure 2 is a horizontal section taken through Figure 1 on line 2—2 thereof.

In order to avoid loss of heat due to radiation the reaction chamber 1 is so arranged that it is surrounded by two regenerators 2' and 2''. In the cover of the apparatus there is a nozzle 6 for the introduction of the fuel into the reaction chamber 1. The regenerators are provided with a piping 7 for admitting combustion air, with a piping 8 for admitting steam and water gas and with a piping 9 for taking off the waste gases, valves being provided in all these pipings. The reaction chamber projects into a container 5 which is provided with a device 10 for the removal of the ashes and with a piping 11 for taking off the generated water gas. Round the upper end of the reaction chamber 1 an annular wall 20 is arranged, forming with the wall of the reaction chamber an annular channel 22, closed at the bottom and open at the top. This channel stands in connection with the interior of the reaction chamber by a plurality of apertures 21 which are inclined downward towards the interior of the reaction chamber.

The operation of the apparatus when carrying out the process according to this invention is as follows:

Through piping 8 and open valve 8' a mixture of steam and water gas is introduced into regenerator 2', the latter having been heated up previously. Through the nozzle 6 fuel in finely divided condition is injected continuously into the reaction chamber 1. At the top opening 4 of the reaction chamber 1 steam and water gas which have been heated in the regenerator 2' enter the former, getting mixed with the fuel and carrying same in state of suspension along the reaction chamber. The steam reacts with the fuel in the known manner thus forming water gas. Through the annular channel 22 and the apertures 21 additional heated steam and water gas enter and are admitted to the flow comprising steam, water gas, fuel and the water gas which has been generated by the reaction. The current passes down the reaction chamber whereby the reaction is continued. The generated water gas enters the container 5 where owing to the sudden increase of cross section and the diminishing of velocity gas and ashes get separated. The ashes settle and are removed through the device 10 from time to time; the generated water gas is taken off through piping 11. While the heat stored in regenerator 2' is transmitted to the mixture of steam and water gas which passes through it, regenerator 2'' is heated up by burning part of the water gas introduced through piping 8 and valve 8' with air introduced through piping 7 and the open valve 7'', the waste gases being taken off through valve 9'' and piping 9. When regenerator 2' is cooled down and regenerator 2'' is heated up, valves 7'', 9'' and 8' are closed and valves 7', 9' and 8'' are opened, the heating of the mixture of steam and water gas now taking place in regenerator 2'' and regenerator 2' being heated up again.

It will be understood that no restriction is made to the manner of carrying out the process according to this invention as it has been described with reference to the drawing, as this only shows an example of an apparatus for generating water gas according to this invention. For instance the manner of heating up the regenerators may be another without departing from the spirit of this invention as the water gas used for heating up the regenerator may just as well be introduced not together with the steam and not pass the regenerator heated up already before entering the regenerator which is to be heated but may be injected into the latter directly.

It will be noted that in the drawing I have provided a particularly appropriate arrangement of parts of the device being illustrated, the regenerator 2 having the accumulator for manufactured gas mounted immediately beneath same and with the reaction chamber pipe extending directly into the accumulator 5. In both the reactions for manufacture of the water gas, to wit with CO, or CO$_2$ as a part thereof, shown in the following two reactions for water gas $C + H_2O = CO + H_2$; or

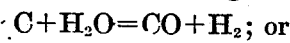

$C + 2H_2O = 2H_2 + CO_2$, heat is absorbed in each type of reaction and hence the temperature of the carbon is rapidly lowered until the reaction practically comes to an end, unless the temperature can be maintained progressively along the reaction chamber by the introduction of more superheated steam needed to maintain the high temperature and rate of reaction, same being provided for in my present invention.

It will be understood that no restriction is made to the particular form of embodiment shown in the drawing, and that various modifications may be made within the meaning of the above and the appended claims without departing from the spirit of the invention.

What I claim as new and desire to secure by Letters Patent is:

1. A method of producing water gas from fuel in finely divided condition in continuous operation in a reaction chamber having no solid fuel bed, which comprises heating up alternately one of two regenerators by burning gas and air in the one generator and superheating steam in the other generator, injection fuel in finely divided condition into the reaction chamber, admitting superheated steam to the fuel upon its entry into the reaction chamber, admitting additional superheated steam to the current of superheated steam and water gas generated by reaction of steam and part of the fuel, this current carrying the finely divided fuel in state of suspension along with it, at a plurality of points along the initial course of this current in the reaction chamber, and gasifying the fuel.

2. A method of producing water gas from pulverulent coal in continuous operation in a reaction chamber having no solid fuel bed, which comprises heating up alternately one of two regenerators by burning gas and air in the one generator and superheating steam in the other generator, injecting pulverulent coal into the reaction chamber, admitting superheated steam to the pulverulent coal upon its entry into the reaction chamber, admitting additional superheated steam to the current of superheated steam and water gas generated by reaction of steam and part of the pulverulent coal, this current carrying the pulverulent coal in state of suspension along with it, at a plurality of points along the initial course of this current in the reaction chamber, and gasifying the pulverulent coal.

3. A method of producing water gas from pulverulent coal in continuous operation in a reaction chamber having no solid fuel bed, which comprises heating up alternately one of two regenerators by burning gas and air in the one generator and heating a mixture of steam and water gas in the other regenerator, injecting pulverulent coal into the reaction chamber, admitting a heated mixture of steam and water gas to the pulverulent coal upon its entry into the reaction chamber, admitting an additional heated mixture of steam and water gas to the current of heated steam and water gas, which carries the pulverulent coal in state of suspension along with it, at a plurality of points along the initial course of this current in the reaction chamber, and gasifying the pulverulent coal.

4. A method of producing water gas from hydrocarbons in continuous operation in a reaction chamber having no solid fuel bed, which comprises heating up alternately one of two regenerators by burning gas and air in the one of said generators and superheating steam in the other generator, injecting hydrocarbons into the reaction chamber, admitting superheated steam to the hydrocarbons upon their entry into the reaction chamber, admitting additional superheated steam to the current of superheated steam and water gas generated by reaction of steam and part of the hydrocarbons, this current carrying the hydrocarbons in state of suspension along with it, at a plurality of points along the initial course of this current in the reaction chamber, and gasifying the hydrocarbons.

5. A method of producing water gas from hydrocarbons in continuous operation in a reaction chamber having no solid fuel bed, which comprises heating up alternately one of two regenerators by burning gas and air in one of said generators and heating a mixture of steam and water gas in the other regenerator, injecting hydrocarbons into the reaction chamber, admitting a heated mixture of steam and water gas to the hydrocarbons upon their entry into the reaction chamber, admitting an additional heated mixture of steam and water gas to the current of heated steam and water gas, which carries the hydrocarbons in state of suspension along with it, at a plurality of points along the initial course of this current in the reaction chamber, and gasifying the hydrocarbons.

In testimony whereof I have affixed my signature.

HERMANN HILLEBRAND.